United States Patent Office 3,492,286
Patented Jan. 27, 1970

3,492,286
REACTIVE WATER-SOLUBLE p-DIPHENYLENE-AZO-PYRAZOLONE DYES HAVING A HALO-SUBSTITUTED HETEROCYCLIC REACTIVE GROUP
August Schweizer, Muttenz, Basel-Land, Switzerland, assignor to Sandoz Ltd. (also known as Sandoz A.G.), Basel, Switzerland
No Drawing. Filed July 11, 1966, Ser. No. 564,023
Claims priority, application Switzerland, July 16, 1965, 10,004/65
Int. Cl. C09b 62/00, 62/04, 62/20
U.S. Cl. 260—153         10 Claims

ABSTRACT OF THE DISCLOSURE

Reactive water-soluble p - diphenylene-azo-pyrazolone dyes having a halo-substituted heterocyclic reactive group are suitable for dyeing leather, wool, silk, polyamide fibers and fibers of natural or regenerated cellulose with yellow to golden yellow colors of brilliant shade and good depth and having good light fastness, excellent wet fading fastness and very good fastness to wet treatment.

This invention relates to reactive dyes of formula

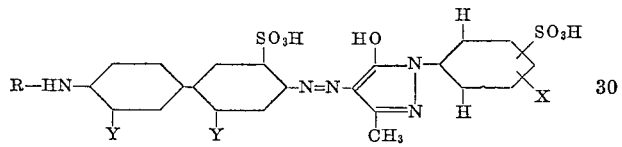

wherein:

R represents a reactive group of the heterocyclic series which bears at least one mobile chlorine or bromine atom and which may be bound through —CO—, —CH$_2$— or —SO$_2$—

X represents hydrogen, halogen, e.g. chlorine, lower alkyl, e.g. methyl, or lower alkoxy, e.g. methoxy, and Y represents hydrogen, methyl or lower alkoxy, e.g. methoxy.

The process for preparing said dyes consists of reacting 1 mol of an amine of the formula

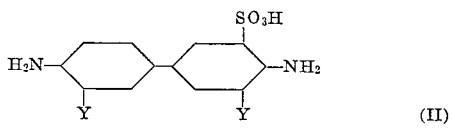

with 1 mol of a reactive component of the heterocyclic series which may bear a halogenomethyl, halogenocarbonyl or halogenosulfonyl group, followed by diazotising the remaining free amino group and coupling with 1 mol of a coupling component of the formula

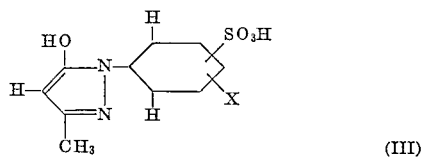

or, alternatively, acylating 1 mol of an amine of Formula II, diazotising of the remaining free amino group, coupling with 1 mol of a coupling component of Formula III, cleaving the acyl group, and finally reacting the liberated amino group with 1 mol of a reactive component of the heterocyclic series which may bear a halogenomethyl, halogenosulfonyl or halogenocarbonyl group.

Examples of amines of Formula II which may be used in the process are 4,4'-diamino-1,1'-diphenyl-3-sulfonic acid, 4,4'-diamino-3,3'-dimethyl- or -3,3'-dimethoxy- or -3,3'-diethoxy-1,1'-diphenyl-5-sulfonic acid.

The following may be enumerated as examples of coupling components of Formula III: 1-phenyl-3-methyl-5-pyrazolone-3'- or -4'-sulfonic acid, 1-(4'-methylphenyl)- or 1-(4'-ethylphenyl)- or 1-(4'-n-butylphenyl)- or 1-(4'-methoxyphenyl)- or 1-(4'-ethoxyphenyl)- or 1-(4'-chlorophenyl)-3-methyl-5-pyrazolone-3'-sulfonic acid, 1-(3'-methylphenyl)- or 1-(3'-methoxyphenyl)-3-methyl-5-pyrazolone-4'-sulfonic acid.

Of the possible reactive components of the heterocyclic series which may have a halogenomethyl, halogenosulfonyl or halogenocarbonyl group, those of primary interest are the ones that contain at least two hetero atoms, preferably two nitrogen atoms or one nitrogen and one oxygen atom or one nitrogen and one sulfur atom, in the heterocyclic ring and bear at least two mobile chlorine and/or bromine atoms, for example, those of the diazine series, preferably of the pyrimidine or pyridazone series, of the triazine series, preferably the 1,3,5-triazine series, or of the quinoxaline and phthalazine series. Examples of reactive components meeting these requirements are cyanuric chloride, cyanuric bromide, the primary condensation products of a cyanuric halide having the constitution

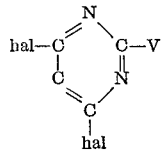

where hal represents chlorine or bromine, and v the radical, which may be further substituted, of a primary or secondary aliphatic, alicyclic, aromatic or heterocyclic amine or of an aliphatic, alicyclic, aromatic or heterocyclic hydroxy compound, in particular the radical of aniline, its alkyl and sulfonic acid or carboxylic acid derivatives, or the radical of lower mono- or di-alkylamines or of ammonia. Further examples are 2,4,6-trichloropyrimidine and 2,4,6-tribromopyrimidine and their derivatives which may bear in the 5 position the following substituents: methyl, ethyl, carboxymethyl, chloro- or bromo-methyl, 5-bromo-2,4,6-trichloropyrimidine, 2,4,5,6-tetrachloro- or 2,4,5,6-tetrabromo-pyrimidine, 2,4-dichloro-5-chloromethyl-6-methylpyrimidine, 2,4-dibromo-5-bromomethyl-6-methylpyrimidine, 2,4-dichloro-5-chloromethylpyrimidine, 2,4-dibromo-5-bromomethylpyrimidine, 2,4-dichloro- or 2,4-dibromo-pyrimidine-5-carboxylic acid chloride or bromide, 2,4-dichloro-6-chloromethylpyrimidine-5-carboxylic acid chloride, 2,3-dichloroquinoxaline-6-carboxylic acid chloride or -6-sulfonic acid chloride, 2- or 3-monochloroquinoxaline-6-carboxylic acid chloride, 1,4-dichlorphthalazine-6-carboxylic acid chloride, 2-chlorobenzoxazole-5-, -6- or -7-carboxylic acid chloride, 2-chlorobenzothiazole-5-carboxylic acid or -5-sulfonic acid chloride, 3- or 4-(4',5'-dichloro-6'-pyridazonyl-1')-benzene-1-carboxylic acid chloride or β-(4',5'-dichloro-6'-pyridazonyl-1')-propionic acid chloride.

The reaction of the amine of Formula II or of the aminomonoazo dye with the reactive component can be conveniently effected in aqueous medium, for example in the temperature range of 0° to 10° C. and at a weakly acid reaction, preferably at pH 3 to 6, in the case of the cyanuric halides. The cyanuric halide can be used in solid form as it is or in solution in an organic solvent, for example in acetone. For the primary condensation products of a cyanuric halide the optimum temperature range is 30–60° C. and the optimum pH value 4 to 6, while for the tri- and tetra-halogenopyrimidines temperatures of 40° to 100° C. and pH values of 3 to 9, or preferably 4 to 7, are the most suitable. If temperatures higher than about 40° C. are necessary, it is advisable to work in a closed reaction kettle fitted with a reflux condenser, because certain halogenopyrimidines are volatile in water vapour.

For the carboxylic acid halides of the halogenated heterocyclic compounds the temperature may range from 0° to 100° C., e.g. 0° to 50° C., or preferably 0° to 25° C. for the 2,4-dihalogenopyrimidine-5-carboxylic acid halides, about 10° to 50° C. or preferably 20° to 30° C. for the 3- or 4-(4',5'-dichloro-6'-pyridazonyl-1')-benzenecarboxylic acid chlorides, about 20° to 90° C. for the halogeno-quinoxaline, -phthalazine-, -benzoxazole or benzothiazole-carboxylic acid chlorides and -sulfonic acid chlorides, and preferably about 30° to 70° C. for 2,3-dichloroquinoxaline-6-carboxylic acid chloride and -6-sulfonic acid chloride.

The reaction is best carried out at a weakly alkaline, neutral or weakly acid reaction, preferably within the pH range of 7 to 3, e.g. pH 6 to 4. To maintain the pH value constant throughout the reaction of the amino group with the reactive component, an acid-binding agent, for example sodium acetate or a phosphate buffer, is added to the reaction mixture at the beginning of the operation, or alternatively small portion of sodium or potassium carbonate or bicarbonate in solid, pulverised form or in aqueous solution are added in the course of the reaction. Other suitable neutralising agents are aqueous solutions of sodium or potassium hydroxide. The addition of small amounts of a wetting or emulsifying agent can accelerate the rate of reaction. The reaction with the halogenated heterocyclic compounds is conducted so that only one halogen atom reacts with an exchangeable hydrogen atom of the amino group.

The acylation of the amine of Formula II is carried out to best advantage with lower molecular alkanoic acid halides or anhydrides, chlorocarbonic acid alkyl or aryl esters, e.g. acetic, propionic or butyric acid chloride or anhydride, or with chlorocarbonic acid methyl, ethyl or phenyl ester. The halides of benzenecarboxylic, alkanesulfonic, benzenesulfonic and methylbenzesulfonic acid are less suitable because the carboxylic acid and sulfonic acid amides formed with these are difficult to hydrolyse.

It is advisable to work in an aqueous medium at temperatures of 0° to 100° C. and at a weakly acid, neutral to weakly alkaline reaction, e.g. in the pH range of 4 to 9 or preferably 5 to 7. When acid anhydrides are used the acylation can be carried out at 50–80° C., while for the acid halides and the chlorocarbonic acid esters temperatures of 0° to 50° C. are suitable. The unilaterally reacted amine can be diazotised either directly in an ice-cold mineral acid, e.g. 2 to 10% hydrochloric or sulfuric acid, or indirectly. In the indirect method the unilaterally reacted amine is dissolved in the solution of a suitable alkali, e.g. sodium hydroxide, sodium carbonate or one of the corresponding potassium or lithium compounds, and the necessary amount of sodium nitrite is added to the solution, either in powder form or in concentrated aqueous solution. The combined solution is then run into an ice-cold mineral acid, preferably 2 to 10% hydrochloric or sulfuric acid. The diazo compound forms rapidly and settles out. It can be suctioned off and suspended in ice water, or if preferred the excess acid can be neutralised and the diazo compound used as it is in the reaction medium for the subsequent coupling reaction with the coupling component of Formula III.

The coupling reaction is carried out to best advantage in a very weakly acid, neutral to alkaline medium, preferably in the pH range of 5 to about 12, e.g. pH 7–10, and at 0° to 20° C. As acid-binding agents it is best to use the carbonates or bicarbonates of the alkali metals, e.g. sodium carbonate or bicarbonate. Other acid-binding agents in regular use, such as the acetates, borates, phosphates, silicates and hydroxides of the alkali metals, can be used if desired, but with these due attention must be paid to the fact that the strongly alkaline reaction of hydroxides, silicates and tertiary phosphates can lead to decomposition of the diazo compound, that borax has relatively low solubility in water, and that the acetates develop their buffering action better in the acid region.

The dyes thus formed, when they contain a reactive group, are salted out or precipitated with acid, if desired after neutralisation of their solutions, and are then filtered off, washed if necessary and dried.

The dyes which contain an acyl group are submitted to hydrolysis. Cleavage of the acyl group can be accomplished in a mineral acid medium, e.g. in 2 to 10% hydrochloric or sulfuric acid, in the temperature range of 70° to 100° C., but an alkaline medium is preferable, e.g. 2 to 10% or preferably 3 to 5% sodium hydroxide or potassium hydroxide solution; the temperature range is 80° C. to the boiling point of the solution, or more particularly 90–95° C.

The introduction of the reactive group and the isolation of the final dyes are carried out as described in the foregoing.

Exemplary dyes are, e.g., those of the following formulae:

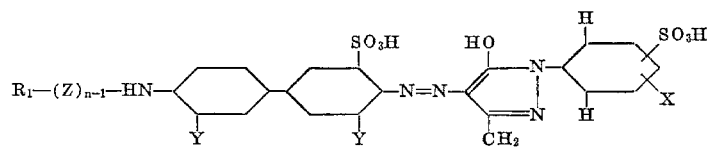

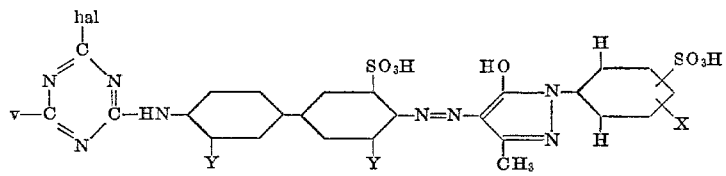

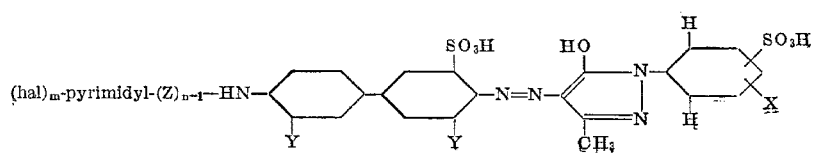

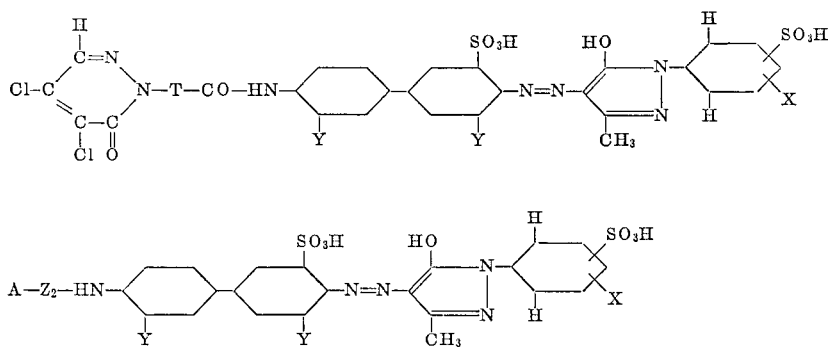

wherein:

$R_1$ is a heterocyclic reactive group having at least two ring hetero atoms and at least one mobile chlorine or bromine atom, the heterocycle being, e.g., phthalazinyl, quinoxalyl, pyrimidyl, triazinyl, pyridazonyl, benzoazolyl or benzothiazolyl;

X is either a hydrogen atom, chloro, lower alkyl or lower alkoxy;

Y is either a hydrogen atom, methyl or lower alkoxy;

Z is —CO—, —SO$_2$— or —CH$_2$—;

$m$ is either 2 or 3;

$m$ is either 1 or 2;

hal or halo is either chloro or bromo;

$v$ is chloro, bromo, lower alkoxy, phenoxy, sulfophenoxy, amino, lower alkylamino, di-(lower alkyl)-amino, lower hydroxyalkylamino, di-(lower hydroxyalkyl)-amino, lower alkoxy-alkylamino, lower carboxy-alkylamino, lower sulfoalkylamino, N-lower alkyl-N-lower sulfoalkyl-amino, sulfophenylamino, sulfo-carboxy-phenylamino or N-lower alkyl-N-sulfophenylamino;

T is —CH$_2$—CH$_2$—, 1,3-phenylene or 1,4-phenylene;

A is 2-halo-benzoxazolyl-5-, -6- or -7-; 2-halo-benzothiazolyl-5-; 2,3-dihalo - quinoxalyl-6- or 1,4 - dihalo-phthalazinyl-6-;

$Z_2$ is —CO— or —SO$_2$—.

The new reactive dyes of this invention posess good substantivity, that is to say, good affinity for cellulosic fibres. They dissolve readily in water and show good stability to hard water and good compatibility with salt. Because of these properties they can be dyed at the short liquor ratio of 1:10, in many cases 1:3, and subsequently the proportion of dye not fixed by reaction with the fibre can be washed off with ease. The dyes also show good stability when the dyebath is maintained at the boil for some length of time. They are stable to alkalis and show little sensitivity to reducing substances.

Applied from an alkaline bath, the dyes cover viscose rayon materials of irregular affinity. From an acid bath they build up on wool, silk and polyamide fibres. They reserve polyester, polyacrylonitrile, polyvinyl chloride, polyvinyl acetate and polyalkylene fibres. The dyes are thus suitable for dyeing leather and for dyeing or padding wool, silk, polyamide, fibres and fibres of natural or regenerated cellulose, e.g. cotton, linen, viscose rayon and cuprammonium rayon, in all textile forms, and similarly for blends of the aforementioned fibres.

The optimum conditions of application vary with the nature of the fibre and the dyes selected for it. Wool, silk and polyamide fibres are dyed preferably from an acid, neutral or weakly alkaline medium or fixed in such a medium, in the presence of acetic, formic or sulfuric acid, ammonium sulfate, sodium metaphosphate, etc. The dyes can be applied in the presence of levelling agents from an acetic acid to neutral bath, examples of suitable agents being polyoxyethylated fatty amines and mixtures of these and alkylpolyglycol ethers; at the end of dyeing the bath is adjusted to a neutral or weakly alkaline reaction with a small amount of an agent of alkaline reaction, e.g. ammonia, sodium carbonate or bicarbonate, or of compounds which react alkaline on heating, e.g. hexamethylene tetramine or urea. The dyed goods are then well rinsed and if necessary acidified with a little acetic acid.

The brilliant yellow to golden yellow dyeing obtained with the dyes of the present invention have good fastness to light in the dry state and excellent fastness in the wet state ("wet fading fastness"), together with very good fastness to wet tests, e.g. water, water spotting, washing, milling, perspiration, wet rubbing and acid cross dyeing. They are stable to acid vapours, sulfurous acid and even to strong acids, such as sulfuric acid, and withstand commercial dry cleaning.

For dyeing or padding the dyes on cellulosic fibres, or for their fixation on these fibres, it is best to use an alkaline medium containing, for example, sodium carbonate or bicarbonate, sodium hydroxide or potassium hydroxide solution, sodium metasilicate, sodium borate, trisodium phosphate, ammonia, etc. It is often of advantage to add a mild oxidising agent, such as sodium 1-nitrobenzene-3-sulfonate, in order to prevent reduction effects in dyeing or pad application. The dyes are fixed on cellulosic fibres either at room temperature or above, depending on the nature of the reactive group.

The dyeings obtained on cellulosic textiles have extremely good wet fastness properties owing to the formation of a stable chemical linkage between the dye molecule and the cellulose molecule. The entire amount of dye applied to the fibre does not always take part in the reaction with the fibre; in such cases the unreacted proportion is cleared from the goods by rising and/or soaping, if necessary at temperatures above room temperature. Synthetic detergents can be used to assist clearing, for example alkylarylsulfonates such as sodium dodecylbenzenesulfonate, alkyl sulfates such as sodium cetyl sulfate and sodium lauryl sulfate, and alkyl-, monoalkyl-phenyl- and dialkyl-phenyl-polyglycol ethers which may be sulfated or carboxymethylated such as sodium lauryl polyglycol ether sulfate.

Yellow to golden yellow dyeings of brilliant shade and good depth are obtained which have good light fastness, excellent wet fading fastness and very good fastness to wet treatments such as water, water spotting, washing, perspiration, soda boiling, alkali, wet rubbing and acid cross dyeing. They show good stability to acid vapours, sulfurous acid and even to strong acids such as dilute sulfuric acid, are stable to resin finishing processes and fast to commercial dry cleaning.

The dyes of this invention can be dyed in combination with other reactive dyes to give orange, brown or green dyeings, for example with blue dyes of the anthraquinone series or red dyes of the azo series. These combination dyeings are free from catalytic fading and have very good wet fading fastness. In the following examples the parts and percentages are by weight and the temperatures in degrees centigrade.

EXAMPLE 1

26.4 parts of 4,4'-diamino-1,1'-diphenyl-3-sulfonic acid are dissolved in 1000 parts of water and 13 parts of 30% sodium hydroxide solution at 75°, and 24 parts of 2,4,5,6-tetrachloropyrimidine are added thereto. The reaction mixture is stirred for 2–3 hours at 75–80°, the pH being kept constant at 4 to 5 by the regular addition of 15% aqueous sodium carbonate solution. On completion of the reaction the condensation product is precipitated by the addition of sodium chloride, filtered off and washed with dilute sodium chloride solution.

The moist filtercake of 4-amino-4'-(2",5",6"-trichloro-pyrimidyl-4"-amino)-1,1'-diphenyl-3-sulfonic acid is dissolved in 3500 parts of water at 40° and the solution adjusted to pH 7–8 with some 15% sodium carbonate solution. An aqueous solution of 7 parts of sodium nitrite is added, then the mixture is run with good stirring into an ice-cooled solution of 65 parts of 30% hydrochloric acid in 2150 parts of water. The diazo compound thus formed settles out with a brick-red colour. On completion of diazotisation, the diazo compound is filtered off and stirred into 500 parts of ice water. Then 25 parts of 3-methyl-1-phenyl-5-pyrazolone-4'-sulfonic acid are dissolved in 250 parts of water and 13 parts of 30% sodium hydroxide solution, and after the addition of 25 parts of sodium bicarbonate this solution is cooled to 5° and allowed to flow slowly into the ice cold diazo suspension with good stirring and cooling. A reddish yellow monoazo dye is formed.

On completion of coupling, the suspension is adjusted to pH 5.5–6.0 with 40% acetic acid, 500 parts of acetone are added and it is heated to 60°. After the addition of some sodium chloride, the golden yellow dye is filtered off, washed with dilute sodium chloride solution and dried at 80–90° under vacum. On grinding it is obtained as an orange powder which dissolves in water to give yellow-orange solutions.

DYEING EXAMPLE A

A dyebath is prepared with 3000 parts of softened water, 2 parts of the dye disclosed in Example 1, 3 parts of sodium 1-nitrobenzene-3-sulfonate and 15 parts of calcined sodium carbonate. At 40° 100 parts of mercerised cotton sateen fabric are entered into the bath. It is then raised to 90° in 30 minutes, with the addition of 120 parts of calcined sodium sulfate at 55° and 120 parts at 70°. On reaching 90° a further 45 parts of calcined sodium carbonate are added and the bath is held at this temperature for 1 hour. The dyed fabric is then removed, rinsed with cold and hot water, soaped for 20 minutes at 95–100° in a solution of 0.03% of a carboxymethylated alkylpolyglycol ether and 0.05% calcined sodium carbonate, rinsed again and dried. A golden yellow dyeing is obtained which has a very good fastness to wet tests (water, sea water, washing, perspiration, soda boiling, alkali, acid, acid vapours, acid cross dyeing and wet rubbing), good light fastness and very good wet fading fastness, both in self shades and in combination shades with blue anthraquinone dyes.

EXAMPLE 2

26.4 parts of 4,4'-diamino-1,1'diphenyl-3-sulfonic acid are dissolved in 1500 parts of water and 13 parts of 30% sodium hydroxide solution at 50°, with the subsequent addition of 33 parts of 2-phenylamino-4,6-dichloro-1,3,5-triazine-3'-sulfonic acid. The mixture is stirred for 2–4 hours at 45–50°, during which time sufficient 15% sodium carbonate solution is added to maintain the pH at 5 to 6. When the reaction has run its course, the condensation product is precipitated with sodium chloride, filtered off and washed with dilute sodium chloride solution.

The moist filtercake of sodium 4-amino-4'-(2"-phenyl-amino-4"-chloro-1",3",5" - triazinyl - 6" - amino)-1,1'-diphenyl-3,3"'-disulfonate is dissolved in 3000 parts of water at 40° and diazotised according to the procedure of Example 1.

A neutral solution of 25 parts of 3-methyl-1-phenyl-5-pyrazolone-4'-sulfonic acid in 250 parts of water and 13 parts of 30% sodium hydroxide solution is prepared, and 25 parts of sodium bicarbonate are added thereto. This solution is cooled to 5° and the suspension of the diazo compound in ice-water is then run into it, on which the compound couples to form an orange-yellow monoazo dye. On completion of the coupling reaction the dye solution is adjusted to pH 6 with 40% acetic acid and heated to 80°, and the dye is salted out with sodium chloride, filtered off, washed with warm dilute sodium chloride solution, dried and ground. It is then obtained as an orange powder which dissolves in water with a yellow-orange coloration and dyes cellulosic fibres in golden-orange shades of good light and very good wet fastness.

EXAMPLE 3

264 parts of 4,4'-diamino-1,1'-diphenyl-3-sulfonic acid are dissolved at 70° in 2500 parts of water and 133 parts of 30% sodium hydroxide solution. In the course of about 1 hour 140 parts of acetic anhydride are run into the solution at 70° with good stirring, while the pH is maintained at 6 to 7 by simultaneous addition of 10% sodium hydroxide solution. After this addition, 420 parts of sodium chloride are added and the mixture is then stirred at room temperature until the acetyl compound settles out. It is filtered off and the filtercake washed with 20% sodium chlorides solution. The resulting sodium salt of 4'-acetylamino-4-amino-1,1'-diphenyl - 3 - sulfonic acid can be used further in the moist paste form, or alternatively dried at 60–80° in vacuum.

30.6 parts of 4'-acetylamino-4-amino-1,1'-diphenyl - 3 - sulfonic acid in the form of the moist paste of its sodium salt are dissolved in 2500 parts of water. An aqueous solution of 7 parts of sodium nitrite is added and the mixture is run with good stirring into an ice-cooled solution of 60 parts of 30% hydrochloric acid in 250 parts of water. The diazo compound thus formed settles out with an orange colour. On completion of diazotisation the small excess of nitrous acid is decomposed by adding a little aminosulfonic acid.

28 parts of 3-methyl-1-phenyl-5-pyrazolone-4'-sulfonic acid are dissolved in 300 parts of water and 14 parts of 30% sodium hydroxide solution with the subsequent addition of 60 parts of sodium carbonate. The mixture is cooled to 5° and the suspension of the diazo compound is run into it with good stirring. A reddish yellow monoazo dye is formed.

On completion of coupling the mixture is heated to 80° and the monoazo dye precipitated from its solution by the addition of sodium chloride. After the solution has cooled it is filtered off, and the filtercake washed with sodium chloride solution.

For cleavage of the acetyl group, the moist dye is dissolved in 1000 parts of hot water. The solution is adjusted to a content of 3 volume percent NaOH with concentrated sodium hydroxide solution and held at the boil for 1 hour. When the acetyl group has been completely split off the excess sodium hydroxide is neutralised by adding 30% hydrochloric acid. The aminoazo dye is then precipitated with sodium chloride, filtered off and washed with sodium chloride solution. The aminomonoazo dye thus obtained is dissolved in 1000 parts of water and this solution is run into an ice cold suspension of 16 parts of cyanuric chloride in 100 parts of water. The temperature is maintained at 0–3° by good cooling, while the pH value of the reaction mixture is held at 5 to 6 by simultaneous addition of 15% sodium carbonate solution. On completion of condensation the final reactive dye is completely precipitated by the addition of sodium chloride, filtered off and washed with dilute sodium chloride solution, vacuum dried at 40° and ground. It is obtained as an orange powder which dissolves in water with a reddish yellow coloration.

DYEING EXAMPLE B 100 parts of a mercerised cotton sateen fabric are entered into a dyebath at 25° consisting of 3000 parts of water and 2 parts of the dye described in the foregoing example. Over the next 30 minutes 150 parts of calcined sodium sulfate are added in small portions while the bath is stirred at 25–30° until everything goes into solution. Then a further 6 parts of anhydrous sodium carbonate in 20% aqueous solution are added and dyeing continued for 1 hour at 25–30°. The dyed fabric is finished as outlined in Example 1. It has the fastness properties named in that example.

EXAMPLE 4

The aminomonoazo dye obtained according to the procedure of Example 3 with 30.6 parts of 4'-acetylamino-4-amino-1,1'-diphenyl-3-sulfonic acid and 28 parts of 3-methyl-1-phenyl-5-pyrazolone-4'-sulfonic acid and cleavage of the acetyl group is dissolved in the form of the moist paste in 800 parts of water at 30°. With good stirring 27 parts of finely pulverised 2,3-dichloroquinoxaline-6-carboxylic acid chloride are entered in portions. The pH is held at 6 to 7 by the simultaneous addition of 15% sodium carbonate solution. On completion of the coupling reaction the reactive dye formed is completely precipitated with sodium chloride, filtered off, washed with dilute sodium chloride solution, vacuum dried at 60° and ground, to give an orange powder which dissolves in water with a reddish yellow coloration.

The following table contains particulars of further dyes of Formula I conforming to the present invention. They are distinguished by the stated meanings of the radicals R, X and Y, the positions of the radical X and the sulfonic acid group in the phenyl nucleus, and by the shade of their dyeings on cotton.

Table

| Number | R= Radical of | X Nature | X Position | SO₃H position | Y | Shade of dyeing on cotton |
|---|---|---|---|---|---|---|
| 5 | 2,4,5,6-tetrachloropyrimidine | H | 4' | 3' | H | Reddish yellow. |
| 6 | do | CH₃ | 4' | 3' | H | Do. |
| 7 | do | CH₃ | 3' | 4' | H | Do. |
| 8 | do | Cl | 3' | 5' | H | Do. |
| 9 | do | OCH₃ | 4' | 3' | H | Do. |
| 10 | do | OC₂H₅ | 4' | 3' | H | Do. |
| 11 | do | H | 3' | 4' | CH₃ | Yellow. |
| 12 | do | H | 3' | 4' | CH₃O | Do. |
| 13 | 2,4,6-trichloropyrimidine | H | 3' | 4' | H | Reddish yellow. |
| 14 | do | H | 4' | 3' | H | Do. |
| 15 | 2-amino-4,6-dichloro-1,3,5-triazine | H | 3' | 4' | H | Do. |
| 16 | 2-methylamino-4,6-dichloro-1,3,5,-triazine | H | 3' | 4' | H | Do. |
| 17 | 2-phenylamino-4,6-dichloro-1,3,5-triazine-4'-sulfonic acid | H | 3' | 4' | H | Do. |
| 18 | 2-(2'-carboxyphenylamino)-4,6-dichloro-1,3,5-triazine-5'-sulfonic acid | H | 3' | 4' | H | Do. |
| 19 | 2-methoxy-4,6-dichloro-1,3,5-triazine | H | 3' | 4' | H | Do. |
| 20 | 2,3-dichloro-quinoxaline-6-carboxylic acid chloride | H | 4' | 3' | H | Do. |
| 21 | 2,4,6-trichloropyrimidine | C₂H₅ | 4' | 3' | H | Do. |
| 22 | do | H | 3' | 4' | C₂H₅O | Yellow. |
| 23 | 2-ethoxy-4,6-dichloro-1,3,5-triazine | H | 3' | 4' | H | Reddish yellow. |
| 24 | 2-(2'-hydroxypropylamino)-4,6-dichloro-1,3,5-triazine | H | 3' | 4' | H | Do. |
| 25 | 2-(4'-carboxyphenylamino)-4,6-dichloro-1,3,5-triazine | H | 3' | 4' | H | Do. |
| 26 | 2-amino-4,6-dibromo-1,3,5-triazine | H | 3' | 4' | H | Do. |
| 27 | Cyanuric bromide | H | 3' | 4' | H | Do. |
| 28 | 2-carboxymethylamino-4,6-dichloro-1,3,5-triazine | H | 4' | 3' | H | Do. |
| 29 | 2,4,6-tribromopyrimidine | H | 4' | 3' | H | Do. |
| 30 | 2,4,6-trichloro-5-ethyl-primidine | H | 4' | 3' | H | Do. |
| 31 | 2-phenoxy-4,6-dichloro-1,3,5-triazine | H | 4' | 3' | H | Do. |
| 32 | 2,3-dichloro-quinoxaline-6-carboxylic acid chloride | H | 3' | 4' | CH₃ | Yellow. |
| 33 | 2,3-dichloro-quinoxaline-6-sulfonic acid chloride | H | 3' | 4' | H | Reddish yellow. |
| 34 | 2-phenoxy-4,6-dichloro-1,3,5-triazine-4'-sulfonic acid | H | 3' | 4' | H | Do. |
| 35 | 2-(2'-ethoxy-ethylamino)-4,6-dichloro-1,3,5-triazine | H | 4' | 3' | H | Do. |
| 36 | 2,4,6-trichloro-5-carboxymethyl-pyrimidine | H | 4' | 3' | H | Do. |
| 37 | 2-dimethylamino-4,6-dichloro-1,3,5-triazine | CH₃ | 3' | 4' | H | Do. |
| 38 | 2-N-methyl-N-phenylamino-4,6-dichloro-1,3,5-triazine-4'-sulfonic acid | H | 3' | 4' | H | Do. |
| 39 | 2-(N-methyl-N-2'-sulfoethylamino)-4,6-dichloro-1,3,5-triazine | OCH₃ | 3' | 4' | H | Do. |
| 40 | 2-chloro-benzothiazole-5-sulfonic acid chloride | H | 3' | 4' | H | Do. |
| 41 | 2, 4-dichloro-5-chloro-methyl-6-methyl-pyrimidine | H | 3' | 4' | CH₃O | Yellow. |
| 42 | 2,4-dichloro-pyrimidine-5-carboxylic-acid chloride | H | 4' | 3' | H | Reddish yellow. |
| 43 | 2-(2'-carboxy-4'-sulfo-phenylamino)-4,6-di-chloro-1,3,5-triazine | H | 4' | 3' | H | Do. |
| 44 | 2-(2'-hydroxyethyl-amino)-4,6-dichloro-1,3,5-triazine | Cl | 4' | 3' | H | Do. |
| 45 | 2-methylamino-4,6-dibromo-1,3,5-triazine | H | 3' | 4' | H | Do. |
| 46 | 2,4,6-trichloro-5-chloromethylpyrimidine | H | 3' | 4' | H | Do. |
| 47 | 2,4,6-trichloro-5-bromo-pyrimidine | H | 3' | 4' | H | Do. |
| 48 | 1,4-dichlorophthalazine-6-carboxylic acid chloride | | | | | Do. |
| 49 | 2-chlorobenzothiazole-5-carboxylic acid chloride | H | 4' | 3' | H | Do. |
| 50 | 2-chlorobenzoxazole-6-carboxylic acid chloride | H | 3' | 4' | H | Do. |
| 51 | 4-(4',5'-dichloro-6'-pyridazonyl-1')-benzene-1-carboxylic acid chloride | H | 3' | 4' | H | Do. |
| 52 | 2,4-dichloro-5-chloro-methyl-6-methyl-pyrimidine | H | 4' | 3' | H | Do. |
| 53 | 2,4-dibromo-5-bromomethyl-6-methyl-pyrimidine | H | 3' | 4' | H | Do. |
| 54 | 2,4,6-trichloro-5-methyl-pyrimidine | H | 3' | 4' | H | Do. |
| 55 | 2-ethylamino-4,6-dichloro-1,3,5-triazine | H | 3' | 4' | H | Do. |
| 56 | 2-(β-carboxy-ethyl-amino)-4,6-dichloro-1,3,5-triazine | H | 3' | 4' | H | Do. |
| 57 | 2-(3'-carboxyphenyl-amino)-4,6-dichloro-1,3,5-triazine | H | 3' | 4' | H | Do. |
| 58 | 2-bis-(β-hydroxyethyl)-amino-4,6-dichloro-1,3,5-triazine | H | 3' | 4' | H | Do. |
| 59 | β-(4',5'-dichloro-6'-pyridazonyl-1')-propionic acid chloride | H | 3' | 4' | H | Do. |
| 60 | 2,4-dichloro-6-methyl-pyrimidine-5-carboxylic acid chloride | H | 3' | 4' | H | Do. |
| 61 | 2-phenylamino-4,6-dichloro-1,3,5-triazine-2'-sulfonic acid | H | 3' | 4' | H | Do. |
| 62 | 2-(3'-methoxyproply-amino)-4,6-dichloro-1,3,5-triazine | H | 3' | 4' | H | Do. |
| 63 | 2,4-dichloro-5-chloro-methylpyrimidine | H | 3' | 4' | H | Do. |
| 64 | 2-(β-sulfoethylamino)-4,6-dichloro-1,3,5-triazine | H | 3' | 4' | H | Do. |
| 65 | 2-(α-carboxy-ethyl-amino)-4,6-dichloro-1,3,5-triazine | H | 3' | 4' | H | Do. |
| 66 | 2-chloroquinoxaline-6-carboxylic acid chloride | H | 3' | 4' | H | Do. |

Formulae of representative dyes of the foregoing examples are as follows:

Example 1

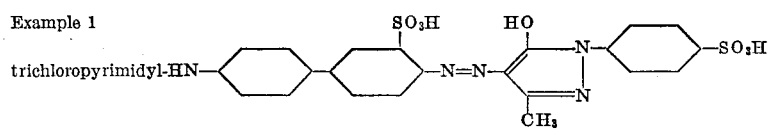

trichloropyrimidyl-HN

Example 2
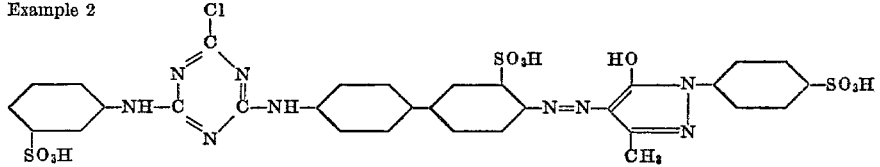

Example 3
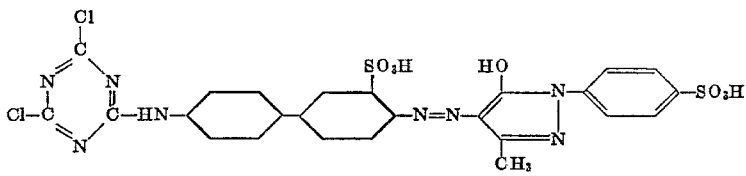

Example 4
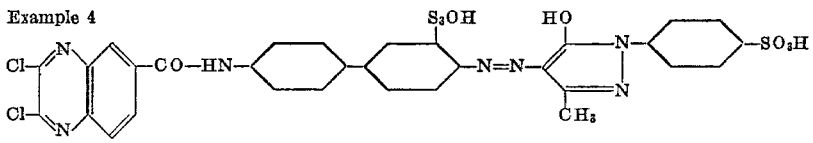

Example 14
dichloropyrimidyl-HN—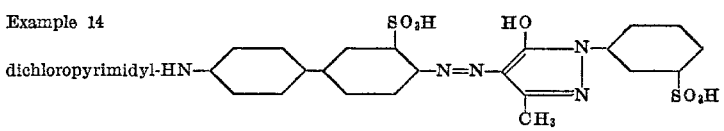

Example 16
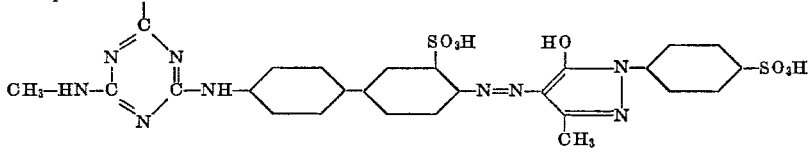

Having thus disclosed the invention what I claim is:
1. A reactive dye of the formula

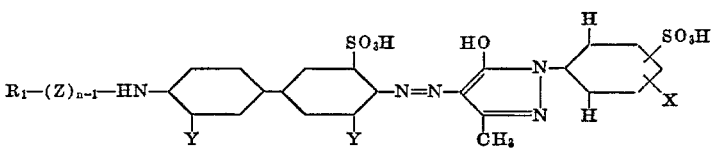

wherein:
$R_1$ is a heterocyclic reactive group, the heterocycle of which is a member selected from the group consisting of phthalazinyl, quinoxalyl, pyrimidyl, triazinyl, pyridazonyl, benzoxazolyl and benzothiazolyl, said heterocycle bearing at least one mobile chlorine or bromine atom;
X is a member selected from the group consisting of hydrogen, chloro, lower alkyl and lower alkoxy;
Y is a member selected from the group consisting of hydrogen, methyl and lower alkoxy;
Z is a member selected from the group consisting of —CO— and —SO$_2$—; and
$n$ is one of the integers 1 and 2.
2. A reactive dye according to claim 1 wherein:
$n$ is 1;
$R_1$ is 4-halo-6-v-triazinyl-2-;

$v$ is a member selected from the group consisting of chloro, bromo, lower alkoxy, phenoxy, sulfophenoxy, amino, lower alkylamino, di(lower alkyl)amino, lower hydroxyalkylamino, di(lower hydroxyalkyl)amino, lower alkoxyalkylamino, lower carboxyalkylamino, lower sulfoalkylamino, N - (lower alkyl) - N - (lower sulfoalkyl)amino, sulfophenylamino, sulfocarboxyphenylamino and N - (lower alkyl) - N -sulfophenylamino; and
halo is chloro or bromo.
3. A reactive dye according to claim 1 wherein:
$R_1$ is 4,5-dichloro-6-pyridazonyl-1-T-;
Z is —CO—;
$n$ is 2; and
T is a member selected from the group consisting of —CH$_2$—CH$_2$—, 1,3-phenylene and 1,4-phenylene.
4. Reactive dye of the formula

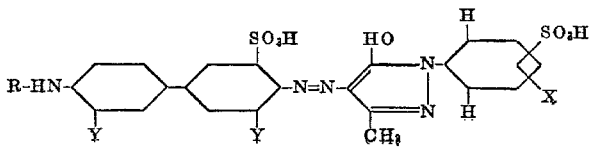

wherein:

R is a member selected from the group consisting of 2,4-dihalo - 5 - w pyrimidyl - 6-, 2,4 - dihalo - 6 - methylpyrimidyl - 5 - methylene, 2,4 - dihalopyrimidyl - 5-carbonyl and 2,4 - dihalo - 6 - methylprimidyl - 5 - carbonyl;

X is a member selected from the group consisting of hydrogen, chloro, lower alkyl and lower alkoxy;

Y is a member selected from the group consisting of hydrogen, methyl and lower alkoxy;

w is a member selected from the group consisting of hydrogen, chloro, bromo, lower alkyl and carboxymethyl; and halo is a member selected from the group consisting of chloro and bromo.

5. Reactive dye according to claim 1 wherein $R_1$ is a member selected from the group consisting of 2-haloquinoxalyl - 6-, 3 - haloquinoxalyl - 6-, 2,3 - dihaloquinoxalyl - 6-, 1,4 - dihalophthalazinyl - 6-, 2 - halobenzoxazolyl - 5-, 2 - halobenzoxazolyl - 6-, 2 - halobenzoxazolyl-7- and 2-halobenzothiazolyl-5-; and $n$ is 2.

6. The reactive dye of the formula

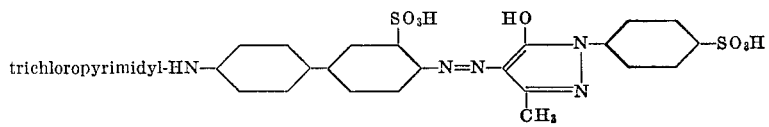

7. The reactive dye of the formula

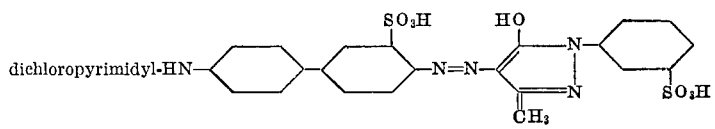

8. The reactive dye of the formula

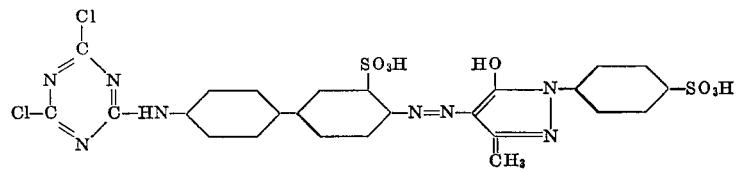

9. The reactive dye of the formula

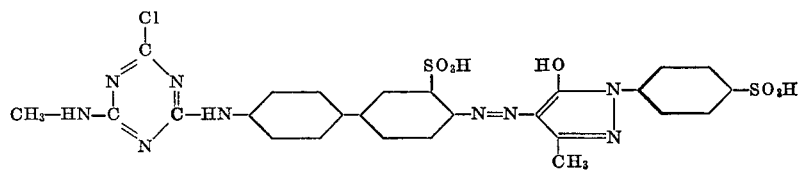

10. The reactive dye of the formula

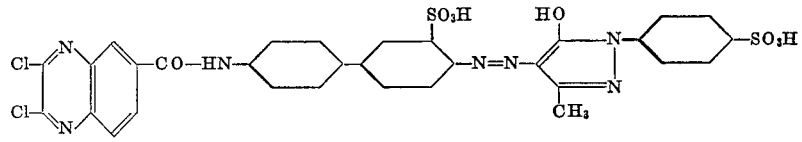

References Cited

UNITED STATES PATENTS

| | | | |
|---|---|---|---|
| 2,892,831 | 6/1959 | Stephen | 260—153 |
| 3,093,628 | 6/1963 | Benz et al. | 260—153 |
| 3,126,369 | 3/1964 | Hensel et al. | 260—154 |
| 3,127,389 | 3/1964 | Seitz et al. | 260—154 XR |
| 3,184,282 | 5/1965 | Cole et al. | 260—153 XR |
| 3,301,843 | 1/1967 | Dussy et al. | 260—154 XR |
| 3,313,797 | 4/1967 | Kissa | 260—154 XR |

FLOYD D. HIGEL, Primary Examiner

U.S. Cl. X.R.

8—41, 50, 51, 13; 260—154, 158, 162

PO-1050
(5/69)

UNITED STATES PATENT OFFICE
CERTIFICATE OF CORRECTION

Patent No. 3,492,286                    Dated   January 27, 1970

Inventor(s)   AUGUST SCHWEIZER

It is certified that error appears in the above-identified patent and that said Letters Patent are hereby corrected as shown below:

Column 1, line 30, in the formula line 38, "-SO$_2$-" should read -- -SO$_2$-,--; line 66, delete "of". Column 2, line 30, in the structure

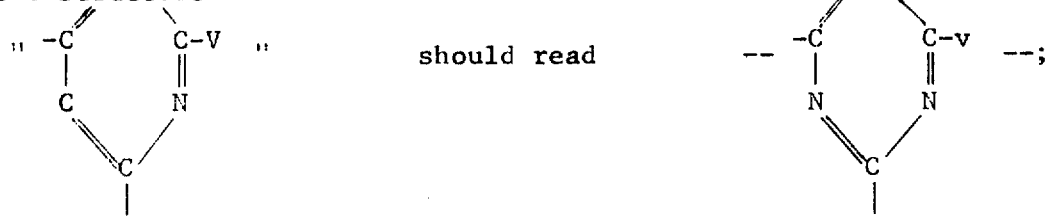

line 33, ", and $v$" should read --, and v--. Column 3, line 13, "-quinoxaline," should read -- -quinoxaline-, --; "benzoxazole or ben-" should read --benzoxazole- or -ben- --; line 25, "portion" should read --portions--; line 41, correct "methylbenzenesulfonic". Column 4, line 50, in the formula

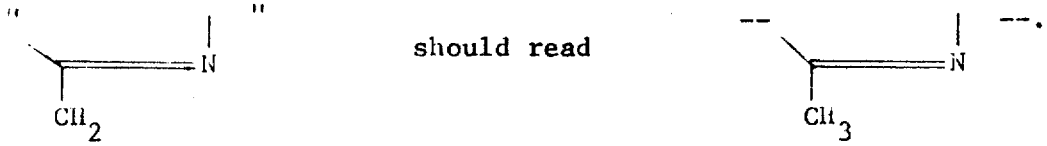

Column 5, lines 22 and 23, "benzoazolyl" should read --benzoxazolyl--; line 28, "$m$" should read --m--; line 29, "$m$ is either" should read --n is either--; line 31, "$v$ is chloro," should read --v is chloro, --. Column 6, line 50, "rising" should read --rinsing--. Column 7, line 19, "2150" should read --250--; line 61, "1,1'diphenyl-" should read --1,1'-diphenyl- --. Column 9, in the table, in example No. 30, "primidine" should read --pyrimidine--; No. 44, "hydroxyethyl-amino" should read --hydroxyethylamino--; No. 56, "-ethyl-amino" should read -- -ethylamino--; No. 57, "-carboxyphenyl-amino" should read -- -carboxyphenylamino--; No. 62, "-methoxyproply-amino" should read -- -methoxypropylamino--; No. 65, "-ethyl-amino" should read -- -ethylamino--. Column 10, line 20, in the heading of the table, "position" should read --Position--; "dyeing

PO-1050
(5/69)

UNITED STATES PATENT OFFICE
CERTIFICATE OF CORRECTION

Patent No. 3,492,286    Dated January 27, 1970

Inventor(s) AUGUST SCHWEIZER

It is certified that error appears in the above-identified patent and that said Letters Patent are hereby corrected as shown below:

page 2 on cotton" should read --Dyeing on Cotton--. Column 11, in the formula for Example 3,

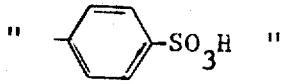    should read    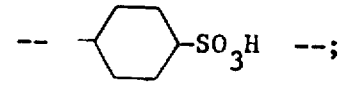

in the formula for Example 4,

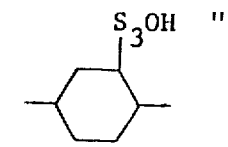    should read    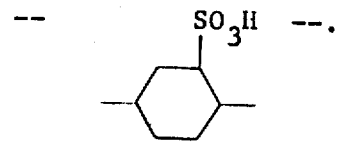

Column 13, lines 3 and 4, delete ", 2,4-dihalo-6-methylpyrimidyl-5-methylene".
Column 14, in claim 7, line 2,

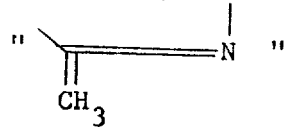    should read    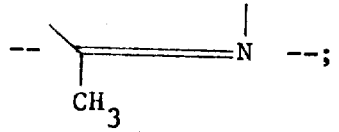

in claim 8, line 2,

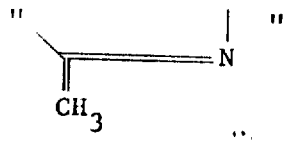    should read    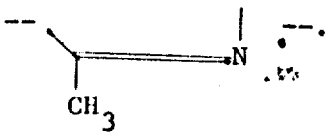

SIGNED AND
SEALED
JUL 21 1970

SEAL)
Attest:

Edward M. Fletcher, Jr.
Attesting Officer

WILLIAM E. SCHUYLER, JR.
Commissioner of Patents